United States Patent
Kuwayama et al.

(10) Patent No.: US 10,189,312 B2
(45) Date of Patent: Jan. 29, 2019

(54) TIRE

(71) Applicant: BRIDGESTONE CORPORATION, Chuo-ku, Tokyo (JP)

(72) Inventors: Isao Kuwayama, Kodaira (JP); Shintaro Hatanaka, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 21 days.

(21) Appl. No.: 15/029,350

(22) PCT Filed: Jun. 23, 2014

(86) PCT No.: PCT/JP2014/003360
§ 371 (c)(1),
(2) Date: Apr. 14, 2016

(87) PCT Pub. No.: WO2015/063972
PCT Pub. Date: May 7, 2015

(65) Prior Publication Data
US 2016/0257169 A1 Sep. 8, 2016

(30) Foreign Application Priority Data
Oct. 29, 2013 (JP) ................................. 2013-224537

(51) Int. Cl.
*B60C 9/22* (2006.01)
*B60C 11/04* (2006.01)
(Continued)

(52) U.S. Cl.
CPC .................. *B60C 9/22* (2013.01); *B60C 9/02* (2013.01); *B60C 9/20* (2013.01); *B60C 9/2009* (2013.01);
(Continued)

(58) Field of Classification Search
CPC .... B60C 9/22; B60C 9/02; B60C 9/20; B60C 11/03; B60C 11/0306; B60C 11/04
See application file for complete search history.

(56) References Cited

U.S. PATENT DOCUMENTS 2,984,282 A * 5/1961 Vittorelli ................... B60C 9/20
152/526
3,612,136 A * 10/1971 Gough ...................... B60C 9/20
152/532
(Continued)

FOREIGN PATENT DOCUMENTS

CN 102161299 A 8/2011
EP 0414470 A2 2/1991
(Continued)

*Primary Examiner* — Jacob T Minskey
*Assistant Examiner* — Melody Tsui
(74) *Attorney, Agent, or Firm* — Kenja IP Law PC

(57) ABSTRACT

A pneumatic tire that makes steering stability, rolling resistance performance, and noise performance compatible includes a carcass toroidally extending between two bead portions; an inclined belt, with inclined belt layer(s) including cords that extend at an inclination relative to a tire circumferential direction, and a circumferential belt, with circumferential belt layer(s) including cords that extend along the tire circumferential direction, radially at an outer side of a crown portion of the carcass; and a tread at an outer side of the circumferential belt in the tire radial direction. An inclination angle of the cords in the inclined belt layers is 35° to 90°, the circumferential belt has a higher tire circumferential direction rigidity per unit width in a central region including a tire equator than in other regions, and in a surface region including the tire equator, the tread includes a land portion continuous in the tire circumferential direction.

15 Claims, 6 Drawing Sheets

(51) Int. Cl.
*B60C 11/03* (2006.01)
*B60C 9/20* (2006.01)
*B60C 9/02* (2006.01)
*B60C 3/04* (2006.01)

(52) U.S. Cl.
CPC .......... *B60C 11/03* (2013.01); *B60C 11/0306* (2013.01); *B60C 11/04* (2013.01); *B60C 3/04* (2013.01); *B60C 2009/2019* (2013.01); *B60C 2009/2048* (2013.01); *B60C 2009/2223* (2013.01); *B60C 2011/0341* (2013.01); *B60C 2011/0386* (2013.01); *Y02T 10/862* (2013.01)

(56) References Cited

U.S. PATENT DOCUMENTS

| | | | | |
|---|---|---|---|---|
| 3,677,319 | A * | 7/1972 | Mirtain | B60C 9/2009 152/527 |
| 6,668,889 | B1 * | 12/2003 | Losey | B60C 9/20 152/527 |
| 2001/0037847 | A1 * | 11/2001 | Miyazaki | B60C 9/0007 152/527 |
| 2006/0048879 | A1 * | 3/2006 | Kuwayama | B60C 9/20 152/534 |
| 2010/0051154 | A1 * | 3/2010 | Ebiko | B60C 11/0306 152/209.18 |
| 2011/0198006 | A1 | 8/2011 | Asayama | |

FOREIGN PATENT DOCUMENTS

| | | |
|---|---|---|
| EP | 1683654 A1 | 7/2006 |
| EP | 1683654 B1 | 1/2008 |
| EP | 2724871 A1 | 4/2014 |
| EP | 2781366 A1 | 9/2014 |
| JP | S61-9314 A | 1/1986 |
| JP | H03200404 A | 9/1991 |
| JP | 2001-233019 A | 8/2001 |
| JP | 2005-225493 A | 8/2005 |
| JP | 2005-350001 A | 12/2005 |
| JP | 2006-321406 A | 11/2006 |
| JP | 2008001248 A | 1/2008 |
| JP | 4312736 B2 | 8/2009 |
| JP | 2010-179777 A | 8/2010 |
| JP | 2010179778 A | 8/2010 |
| JP | 4568540 B2 | 10/2010 |
| JP | 2010-254249 A | 11/2010 |
| JP | 2011-011690 A | 1/2011 |
| JP | 2011016338 A * | 1/2011 |
| JP | 2011126339 A * | 6/2011 |
| JP | 4837813 B2 | 12/2011 |
| JP | 2013-139193 A | 7/2013 |
| WO | 2012176476 A1 | 12/2012 |
| WO | 2013/065319 A1 | 5/2013 |
| WO | 2013065318 A1 | 5/2013 |

\* cited by examiner ized in a region where the tire is manufactured

TIRE

TECHNICAL FIELD

This disclosure relates to a pneumatic tire that has improved steering stability without causing noise performance to deteriorate.

BACKGROUND

One known way of reinforcing a pneumatic tire is to dispose, at the outer side in the tire radial direction of the crown portion of the carcass extending between bead portions, an inclined belt layer including cords extending at an inclination relative to the tire circumferential direction and a circumferential belt layer including cords extending along the tire circumferential direction.

In other words, the tire is reinforced for example by using the inclined belt layer to ensure rigidity in the tire width direction and to yield cornering power, which is one important index of steering stability, and by using the circumferential belt layer to ensure rigidity in the tire circumferential direction and suppress radial growth of the tire when driving at high speed.

In general, since a tire with larger cornering power has excellent steering stability, it is desirable to increase cornering power. Increasing the rigidity of the inclined belt layer in the tire width direction is an effective way of increasing cornering power. Specifically, steeply inclining the cords in the inclined belt layer relative to the tire circumferential direction is one possible approach.

SUMMARY

Technical Problem

It has been discovered, however, that increasing the cord inclination angle of the inclined belt layer changes the vibration mode of the tire and causes large noise emission from the tread surface, thereby causing the noise performance to deteriorate.

It would therefore be helpful to provide a pneumatic tire that has improved steering stability without causing noise performance to deteriorate.

Solution to Problem

Upon diligently studying how to solve the above-mentioned problem, we discovered that in a tire in which the cord inclination angle of the inclined belt layer is increased, the occurrence of noise emission can be suppressed by increasing the rigidity of the circumferential belt layer across a predetermined region that includes the tire equator. In this case, however, we discovered that the cornering power sometimes actually decreases. By studying the cause, we discovered that the cornering power decreases as a result of the ground contact length of the tread surface corresponding to the region in which the circumferential belt layer has high rigidity being shorter than in other portions.

We carefully studied how to make steering stability, represented by cornering power, compatible with noise performance, thereby completing this disclosure.

We provide the following:

(1) A pneumatic tire according to this disclosure comprises a carcass toroidally extending between a pair of bead portions; an inclined belt formed by one or more inclined belt layers including cords that extend at an inclination relative to a tire circumferential direction and a circumferential belt formed by one or more circumferential belt layers including cords that extend along the tire circumferential direction, the inclined belt and the circumferential belt being provided at an outer side of a crown portion of the carcass in a tire radial direction; and a tread disposed at an outer side of the circumferential belt in the tire radial direction; wherein an inclination angle of the cords in the one or more inclined belt layers relative to the tire circumferential direction is 35° or more to 90° or less; the circumferential belt has a higher tire circumferential direction rigidity per unit width in a central region including a tire equator than in other regions; and in a region of a surface of the tread including at least the tire equator, the tread includes a land portion continuous in the tire circumferential direction.

Our pneumatic tire with this structure can improve steering stability without causing noise performance to deteriorate.

As used herein, the phrase "cords extending along the tire circumferential direction" includes not only the case of the cords being parallel to the tire circumferential direction, but also the case of the cords being slightly inclined relative to the tire circumferential direction (at an inclination angle of 5° or less) for example due to forming the belt layer by spirally winding strips of rubber-coated cords.

The phrase "land portion continuous in the tire circumferential direction" refers to a land portion that extends in the tire circumferential direction without being crossed by a groove. In other words, when the land portion is cut along the tire circumferential direction, no groove (excluding sipes or the like) is present at any position along the surface of the cut. For example, in the case of a rib-shaped land portion defined by two zigzag-shaped circumferential grooves, the land portion continuous in the tire circumferential direction refers to the portion within the rib-like land portion that, in planar view of the tread, has the shortest width between the innermost point of one circumferential groove and the innermost point of the other circumferential groove in the tire width direction.

The tire of this disclosure is used by being attached to an applicable rim. The "applicable rim" is an industrial standard effective in the region where the tire is manufactured and used and refers to a standard rim at an applicable size as described in the JATMA YEAR BOOK in Japan, the ETRTO STANDARDS MANUAL in Europe, the TRA YEAR BOOK in the United States of America, or the like (specifically the Measuring Rim in the ETRTO STANDARDS MANUAL and the Design Rim in the TRA YEAR BOOK).

In this disclosure, measurements such as the width in the tire width direction of the inclined belt layer and the circumferential belt layer are taken when the tire is mounted on the applicable rim, air pressure corresponding to the maximum load capability in the applicable size/ply rating described in JATMA or the like ("predetermined air pressure") is applied, and no load is applied.

(2) In the pneumatic tire according to this disclosure, a width, in a tire width direction, of the land portion continuous in the tire circumferential direction is preferably 20 mm or more to 40 mm or less. According to this structure, the cornering power can reliably be increased while maintaining the drainage performance of the tire.

(3) In the pneumatic tire according to this disclosure, the number of the circumferential belt layers in the tire radial direction is preferably greater in the central region than in the other regions. According to this structure, the rolling resistance performance and the noise performance can more reliably be improved.

(4) In the pneumatic tire according to this disclosure, the tread preferably comprises a plurality of circumferential grooves extending along the tire circumferential direction, and edges of the central region in the tire width direction are preferably positioned within an opening width of the circumferential grooves. According to this structure, the cornering power can more reliably be increased.

(5) The pneumatic tire according to this disclosure preferably comprises one or two of the inclined belt layers and comprises two of the circumferential belt layers in the central region and one of the circumferential belt layers in the other regions. According to this structure, an excessive increase in production costs and tire weight can be avoided.

Advantageous Effect

According to this disclosure, a pneumatic tire that has improved steering stability without causing noise performance to deteriorate can be provided.

DETAILED DESCRIPTION

The following describes, in detail, exemplary embodiments of our pneumatic tire (also referred to below simply as a "tire") with reference to the drawings.

Figure 1:
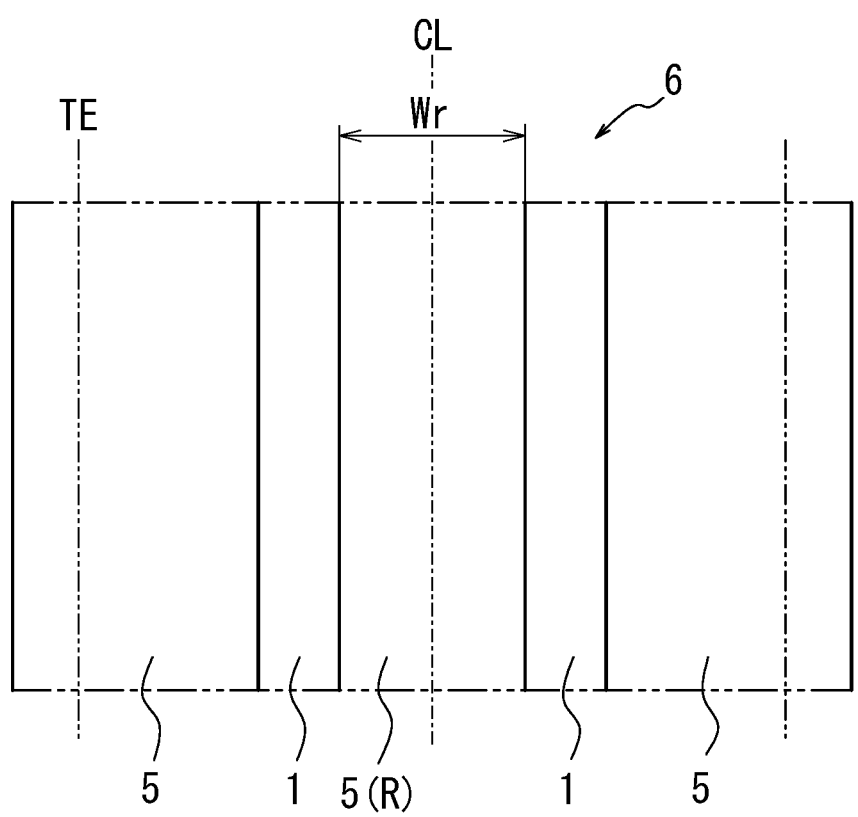
FIG. 1 is a schematic plan view of the tread in the tire according to one of the embodiments.

FIG. 1 is a schematic plan view of a tread 6 in a tire according to one of the embodiments, in this example a pneumatic radial tire for passenger vehicles. On the tread 6 of this tire, three land portions 5 are defined by a plurality (two in the illustrated example) of circumferential grooves 1 extending in the tire circumferential direction on either side of the tire equator CL and the ground contact edges TE of the tread 6. The circumferential grooves 1 are linear in the illustrated example but may be a non-linear shape, such as zigzag-shaped, serrated-shaped, wavy-shaped, or the like. While not illustrated, lateral grooves, sipes, or the like extending at an angle of 0° or more to less than 90° relative to the tire width direction may be provided on the tread 6 in addition to the circumferential grooves 1.

Figure 2:
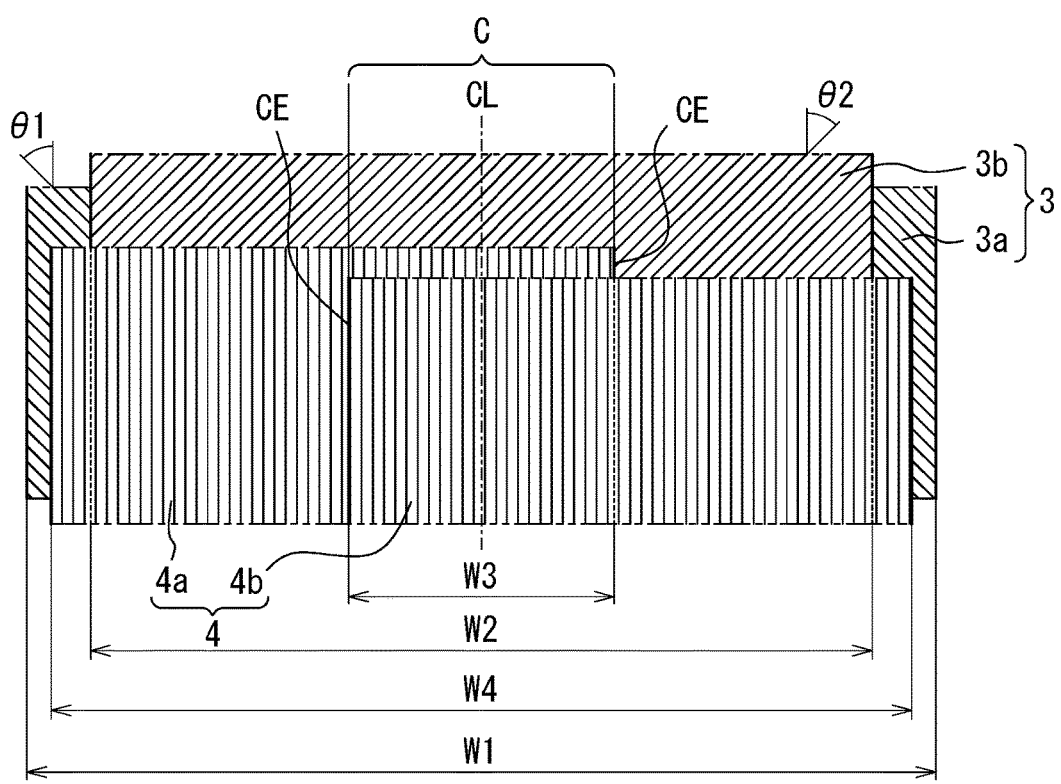
FIG. 2 is a plan view of the belt structure in the tire illustrated in FIG. 1.
Figure 4:
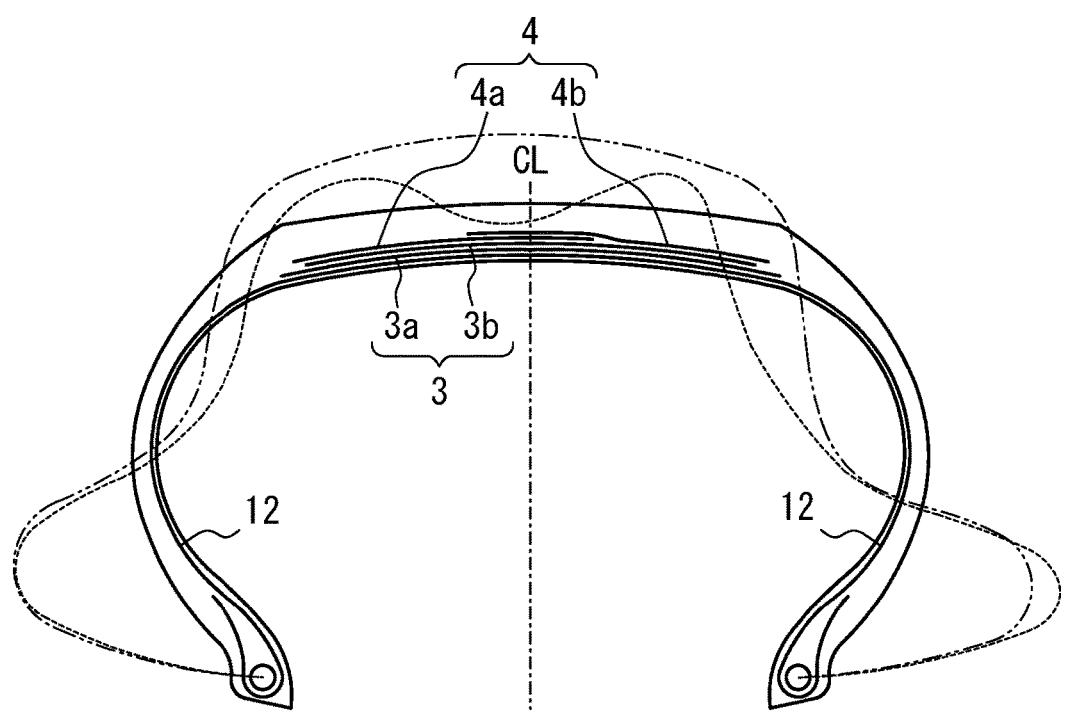
FIG. 4 illustrates the effects of a preferred structure in this disclosure.

FIG. 2 illustrates the belt structure of the tire illustrated in FIG. 1. As illustrated in FIG. 4, the disclosed tire includes a carcass 12 toroidally extending between a pair of bead portions, an inclined belt 3 formed by at least one inclined belt layer (in FIG. 4, a wide inclined belt layer 3a with a width of $W_1$ and a narrow inclined belt layer 3b with a width of $W_2$ in the tire width direction) including cords that extend at an inclination relative to the tire circumferential direction and a circumferential belt 4 formed by at least one circumferential belt layer (in the example in FIG. 4, two circumferential belt layers 4a and 4b with approximately equal width) including cords that extend along the tire circumferential direction, the inclined belt 3 and the circumferential belt 4 being provided at the outer side of a crown portion of the carcass in the tire radial direction, and a tread 6 (see FIG. 1) disposed at the outer side of the circumferential belt 4 in the tire radial direction. In this embodiment, relative to the tire circumferential direction, the cords in the inclined belt layer 3a extend at an inclination angle of $\theta_1$, and the cords in the inclined belt layer 3b extend at an inclination angle of $\theta_2$ in the opposite direction from the cords in the inclined belt layer 3a, so as to sandwich the tire equator CL therebetween. In this embodiment, the belt layers are layered in the order of the inclined belt layers 3a, 3b and the circumferential belt layers 4a, 4b from the inner side in the tire radial direction towards the outer side.

In the disclosed tire, it is crucial that the inclination angles $\theta_1$ and $\theta_2$ of the inclined belt layers 3a and 3b relative to the tire circumferential direction be 35° or more to 90° or less.

According to the disclosed tire with such a structure, the rigidity of the inclined belt layer in the tire width direction can be increased, and the cornering power, which is one important index of steering stability, can be increased. If the inclination angles $\theta_1$ and $\theta_2$ of the inclined belt layers 3a and 3b are less than 35°, then the rigidity relative to the tire width direction decreases. As a result, sufficient steering stability cannot be obtained, especially when cornering, and furthermore the shear deformation of rubber between layers increases, which tends to make the rolling resistance degrade.

The inclination angles $\theta_1$ and $\theta_2$ are more preferably 55° or more to 85° or less. In this case, the cornering power can more reliably be increased.

In the Embodiment illustrated in FIG. 2, the circumferential belts 4a and 4b disposed on the outer side of the inclined belt layers 3a and 3b in the tire radial direction are split up in the tire width direction. By disposing the circumferential belt layer 4b on the outer side of the circumferential belt layer 4a in the tire radial direction, the circumferential belt layers 4a and 4b overlap by a width $W_3$ in the tire width direction in a certain region (central region C) that includes the tire equator CL.

In this way, in the disclosed tire, not only is it crucial to restrict the inclination angle of the cords in the inclined belt layers 3a and 3b, but also to increase the tire circumferential direction rigidity per unit width of the central region C, which includes the tire equator CL, in the circumferential belt 4 above the tire circumferential direction rigidity per unit width of other regions in the circumferential belt 4.

Many tires in which the cords in the inclined belt layers 3a and 3b are inclined relative to the tire circumferential direction within the scope of this disclosure (35° or more to 90° or less) have a shape as indicated by the dash-double dot line in FIG. 4, such that the tread surface uniformly undergoes significant vibration in the high frequency range of 400 Hz to 2 kHz in the primary, secondary or ternary vibration modes in the cross-sectional direction, thereby causing a large noise emission. Therefore, locally increasing the tire circumferential rigidity of the central portion of the tread 6 in the tire width direction makes the central portion of the tread in the tire width direction less prone to expansion in the tire circumferential direction, thereby suppressing expansion of the tread surface in the tire circumferential direction (indicated with the dashed line in FIG. 4). As a result, noise emission can be reduced.

Furthermore, locally increasing the rigidity of the region including the tire equator CL makes the local shear strain of the top rubber (the rubber forming the tread surface layer) larger, thereby also increasing the attenuation of the vibration mode. Improvements to change the rigidity in the tire circumferential direction, as in this disclosure, correspond to an increase in the ring rigidity of the tire and to a change in the direction that suppresses the eccentricity of the tire. Hence, the rolling resistance performance does not deteriorate easily.

Furthermore, in the disclosed tire, it is crucial that the tread 6 include a land portion R (rib-like land portion) continuous in the tire circumferential direction in a region of the surface of the tread 6 including at least the tire equator CL. For example, in the embodiment illustrated in FIG. 1, the land portion R continuous in the tire circumferential direction is defined by a pair of circumferential grooves 1 disposed on either side of the tire equator CL.

The reason for such a structure is described below. The region near the tire equator CL of the tread is naturally always in ground contact when the vehicle is driven. In terms of steering stability, the ground contact length is preferably greater than the outer sides of the tread in the tire width direction. As described above, however, in a tire in which the tire circumferential direction rigidity of the region that includes the tire equator CL has been increased, the ground contact length of the tread becomes shorter near the tire equator CL than at the outer sides in the tire width direction. We learned that the cornering power reduces, and that sometimes the desired steering stability cannot be obtained, depending on the tread pattern. In particular, when disposing a circumferential groove on or near the tire equator CL (see FIG. 5), we discovered that the rigidity of the tread in this region decreases, drastically shortening the ground contact length in the land portion defined by the circumferential groove.

Therefore, in order to improve noise performance without reducing cornering power in a tire that has increased rigidity in the tire circumferential direction near the tire equator CL, it is essential to provide the land portion R (rib-like land portion) that is continuous in the tire circumferential direction across a certain region that includes the tire equator CL.

In this case, if the width Wr of the land portion R in the tire width direction is too small, the amount of increase in the cornering power also reduces. The width Wr is therefore preferably 20 mm or greater. In order to ensure drainage performance, the upper limit on the width Wr is preferably 40 mm.

On the other hand, with regard to tire circumferential direction rigidity in the central region C of the circumferential belt 4, the number of circumferential belt layers 4 in the tire radial direction is preferably greater in the central region C than in other regions, as in the embodiment illustrated in FIG. 2. According to such a structure, the circumferential rigidity of the central region C can be reliably increased.

The tire circumferential direction rigidity of the circumferential belt 4 illustrated in FIG. 2 does not change continuously from the central region C towards the other regions at the outer side in the tire width direction but rather changes at the boundary between regions. In another embodiment, however, a configuration may be adopted wherein the tire circumferential direction rigidity per unit width in the other regions increases towards the central region C, for example by the rigidity decreasing gradually or in a stepwise manner from the inside towards the outside in the tire width direction.

Figure 7A:
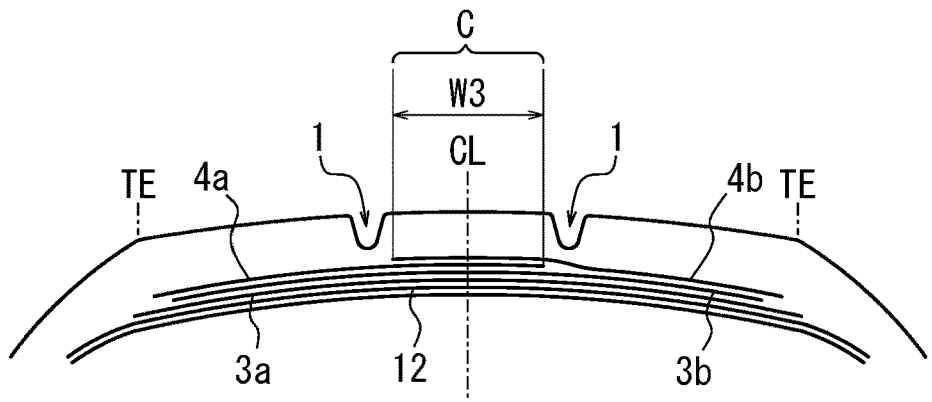
FIGS. 7A, 7B, and 7C illustrate the placement position of circumferential grooves in the tread of the disclosed tire.
Figure 7B:
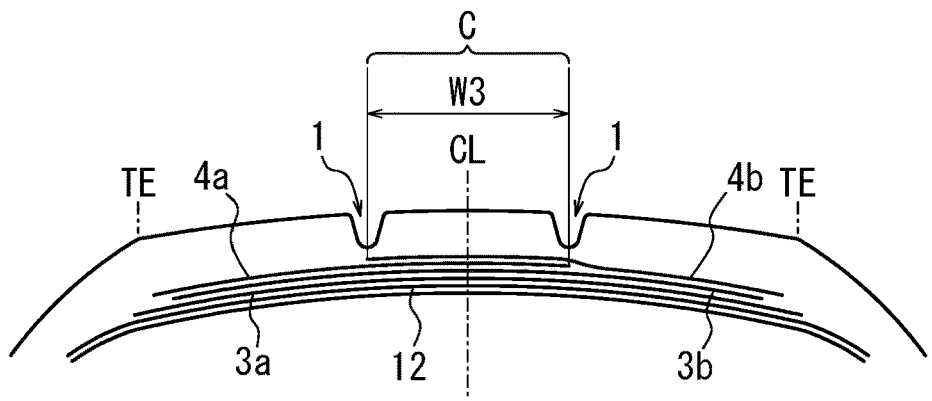

In the disclosed tire, as illustrated in FIG. 7B, the tread 6 preferably includes a plurality of circumferential grooves 1 extending along the tire circumferential direction, and edges CE of the central region C in the tire width direction are preferably positioned within an opening width of the circumferential grooves 1. In other words, the edges CE of the central region C in the tire width direction are disposed in the tread 6 at the positions of the circumferential grooves 1 that have relatively low rigidity.

According to this structure, when the tire rolls under a load, the gauge distribution and rigidity of the central region C can be made uniform at the positions of the circumferential grooves 1. Therefore, the ground contact length near the tire equator CL can be more sufficiently ensured, and the cornering power can be further increased.

Furthermore, the disclosed tire preferably includes one or two of the inclined belt layers 3 and includes two of the circumferential belt layers 4 in the central region C and one circumferential belt layer 4 in the other regions. According to this structure, sufficient durability can be obtained while avoiding an excessive increase in production costs and tire weight.

In the disclosed tire, the width $W_3$ of the central region C in the tire width direction, centered on the tire equator CL, is preferably between 0.2 and 0.6 times the width $W_4$ of the circumferential belt 4 in the tire width direction. In other words, the relationship $0.2 \times W_4 \leq W_3 \leq 0.6 \times W_4$ is preferably satisfied.

If $W_3 < 0.2 \times W_4$, then the central region C is too narrow, and the effect of improving noise performance might not be sufficiently obtained. On the other hand, if $0.6 \times W_4 < W_3$, then the width $W_3$ of the high-rigidity central region C is too large, which tends to induce a mode in which the entire tread vibrates. As a result, the effect of reducing noise emission might not be sufficiently obtained, and there is also a risk of deterioration of rolling resistance due to an increase in tire weight.

The disclosed tire is particularly preferably used as a pneumatic radial tire for passenger vehicles in which, when the internal pressure of the disclosed tire is set to 250 kPa or higher, an SW/OD ratio of the sectional width SW to the outer diameter OD of the tire is 0.26 or less if the tire has a sectional width SW of less than 165 (mm), whereas the sectional width SW and the outer diameter OD of the tire satisfy the relational expression OD 2.135×SW+282.3 if the tire has a sectional width SW of 165 (mm) or greater.

In a tire that satisfies the above ratio and relational expression, i.e. in a tire that has a smaller width and larger diameter than a conventional pneumatic tire for passenger vehicles, the rolling resistance greatly improves, but the cornering power tends to be insufficient due to the narrow tread. Hence, adopting the structure of this disclosure suitably increases the cornering power.

The phrase "sectional width SW of the tire" as used herein is defined as the direct distance between sidewalls that include patterns, characters, or the like on the side surface of the tire, i.e. the width obtained by subtracting the thickness of patterns or characters on the side surface of the tire from the total width, when the tire is mounted on an applicable rim, filled to a predetermined air pressure, and placed under no load. Similarly, the phrase "outer diameter OD of the tire" as used herein refers to the outer diameter in the tire radial direction when the tire is mounted on an applicable rim, filled to a predetermined air pressure, and placed under no load.

Figure 3:
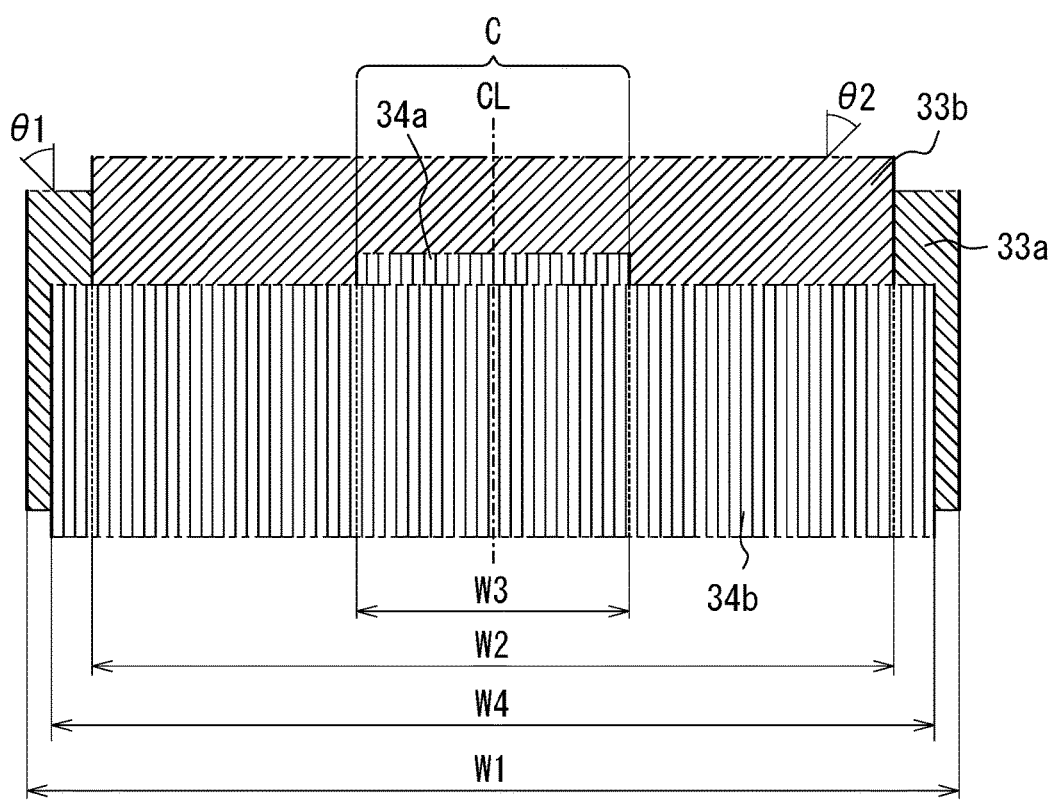
FIG. 3 is a plan view of the belt structure in the tire according to another one of the embodiments.

The belt structure illustrated in FIG. 2 has been used as an example of the belt structure in this disclosure, but the belt structure in FIG. 3, for example, may be adopted. In other words, a narrow circumferential belt layer 34a may be disposed at the outer side of the inclined belt layers 33a and 33b in the tire radial direction, and a wide circumferential belt layer 34b may be disposed so as to cover the circumferential belt layer 34a.

Furthermore, in order to increase the tire circumferential direction rigidity of the central region C of the circumferential belt 4, the number of circumferential belt layers in the tire radial direction is preferably larger than in other regions, as described above. Another approach that can be taken in some cases, however, is to adjust the number of cords implanted in the circumferential belt layer or the strength per cord.

EXAMPLES

The following describes examples according to this disclosure.

Example Tires and Comparative Tires (all having a tire size of 165/60R19) according to the specifications listed in Table 1 were prepared, and the cornering power, rolling resistance performance, and noise performance were evaluated.

Each sample tire had a carcass toroidally extending between a pair of bead portions, two inclined belt layers and one or more circumferential belt layers on the outer side of the crown portion of the carcass in the tire radial direction, and a tread. Steel cords were used as the cords forming the inclined belt layer, and aramid was used in the cords forming the circumferential belt layer(s).

(Cornering Power)

After attaching each sample tire on a rim (size of 5.5J-19) and applying an internal pressure of 300 kPa, each sample tire was mounted on a vehicle and measured in a flat-belt cornering tester. The cornering power obtained under the conditions of a belt speed of 100 km/h and a load condition corresponding to the maximum load capability for the applicable size/ply rating was measured.

The results are listed in Table 1. The results were evaluated as an index, with the cornering power of Comparative Example Tire 1 being 100. A higher value for the index indicates larger cornering power.

(Rolling Resistance Performance)

Under the same conditions as above, each sample tire was mounted on a vehicle and placed on a running test drum, which was rotated at a speed of 100 km/h to measure the rolling resistance. The results are listed in Table 1. The results were evaluated as an index, with the rolling resistance of Comparative Example Tire 1 being 100. A lower value for the index indicates better rolling resistance performance.

(Noise Performance)

Under the same conditions as above, each sample tire was mounted on a vehicle and placed on a running test drum, which was rotated at a speed of 100 km/h to measure the noise level with a traveling microphone method. The results are listed in Table 1. The results were evaluated as the difference from the noise level of Comparative Example Tire 1. A lower value indicates a better effect of reducing noise.

TABLE 1

Figure 5:
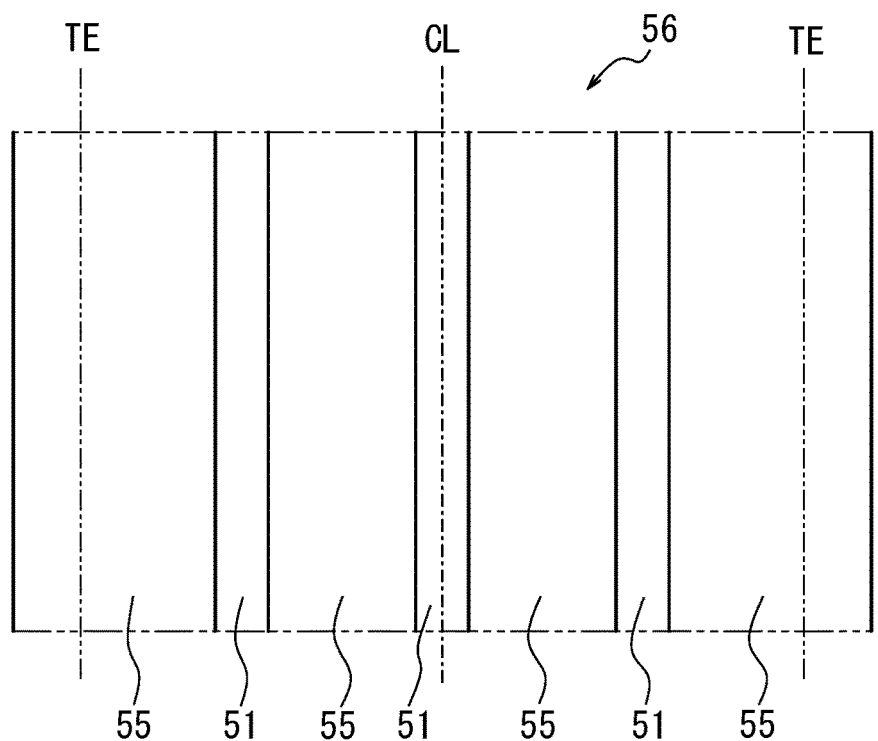
FIG. 5 is a schematic plan view of the tread in a tire of a Comparative Example.
Figure 6:
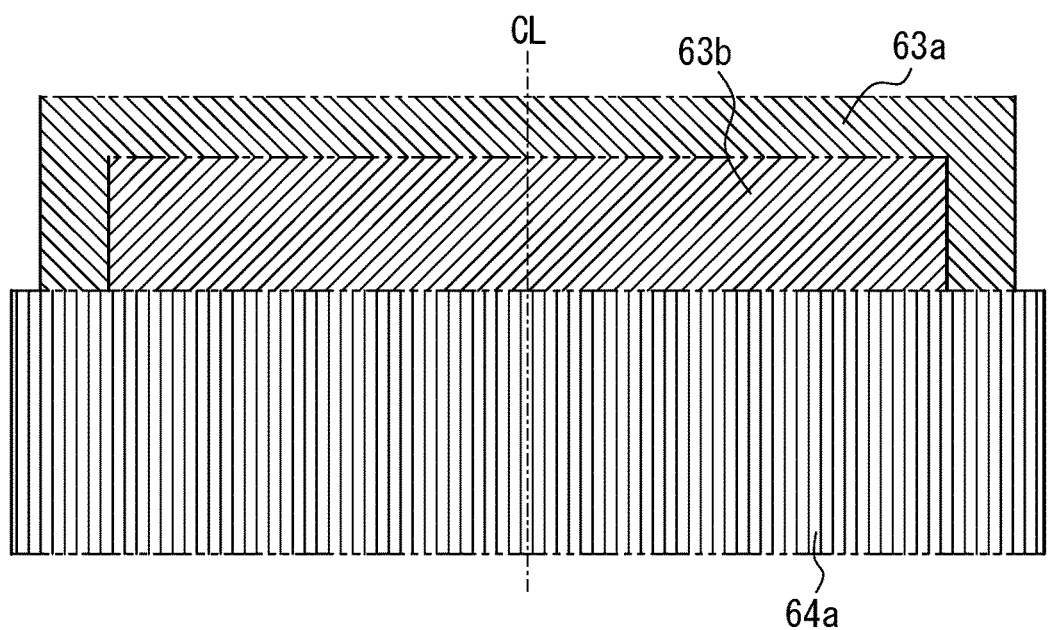
FIG. 6 is a plan view of the belt structure in the tire illustrated in FIG. 5.

| | | Comparative Example 1 | Comparative Example 2 | Comparative Example 3 | Example 1 | Example 2 | Example 3 | Example 4 |
|---|---|---|---|---|---|---|---|---|
| Belt structure | | FIG. 6 | FIG. 6 | FIG. 2 | FIG. 2 | FIG. 2 | FIG. 2 | FIG. 2 |
| Inclined belt layer 3a | θ1 (°) | 28 | 60 | 60 | 35 | 60 | 80 | 60 |
| | W1 (mm) | 135 | 135 | 135 | 135 | 135 | 135 | 135 |
| Inclined belt layer 3b | θ2 (°) | 28 | 60 | 60 | 60 | 60 | 60 | 60 |
| | W2 (mm) | 130 | 130 | 130 | 130 | 130 | 130 | 130 |
| Circumferential belt 4 | Number of layers | 1 | 1 | 2 | 2 | 2 | 2 | 2 |
| | W3 (mm) | — | — | 24 | 24 | 24 | 24 | 24 |
| Tread | Pattern | FIG. 5 | FIG. 5 | FIG. 5 | FIG. 1 | FIG. 1 | FIG. 1 | FIG. 1 |
| | Width of land portion R (mm) | 0 | 0 | 28 | 28 | 28 | 28 | 15 |
| | Position of circumferential groove | — | — | — | FIG. 7A | FIG. 7A | FIG. 7A | FIG. 7A |
| Cornering power (INDEX) | | 100 | 110 | 105 | 108 | 110 | 109 | 106 |
| RRC (INDEX) | | 100 | 95 | 96 | 97 | 94 | 92 | 96 |
| Noise performance (dB) | | 0 | +3.0 | +1.5 | +0.5 | +1.0 | +1.5 | +1.0 |

Figure 7C:
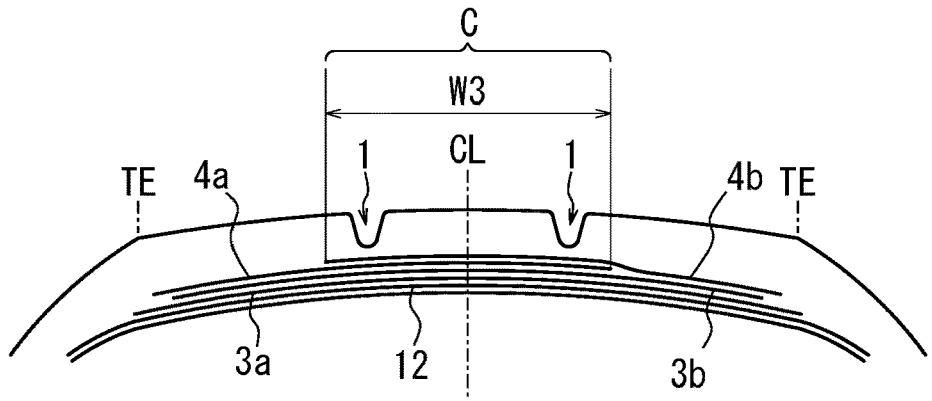

| | | Example 5 | Example 6 | Example 7 | Example 8 | Example 9 | Example 10 | Example 11 |
|---|---|---|---|---|---|---|---|---|
| Belt structure | | FIG. 2 | FIG. 2 | FIG. 2 | FIG. 3 | FIG. 2 | FIG. 2 | — |
| Inclined belt layer 3a | θ1 (°) | 60 | 60 | 60 | 60 | 60 | 60 | 60 |
| | W1 (mm) | 135 | 135 | 135 | 135 | 135 | 135 | 135 |
| Inclined belt layer 3b | θ2 (°) | 60 | 60 | 60 | 60 | 60 | 60 | — |
| | W2 (mm) | 130 | 130 | 130 | 130 | 130 | 130 | — |
| Circumferential belt 4 | Number of layers | 2 | 2 | 2 | 2 | 2 | 2 | 2 |
| | W3 (mm) | 24 | 24 | 24 | 24 | 36 | 48 | 24 |
| Tread | Pattern | FIG. 1 | FIG. 1 | FIG. 1 | FIG. 1 | FIG. 1 | FIG. 1 | FIG. 1 |
| | Width of land portion R (mm) | 20 | 40 | 45 | 28 | 28 | 28 | 28 |
| | Position of circumferential groove | FIG. 7A | FIG. 7A | FIG. 7A | FIG. 7A | FIG. 7B | FIG. 7C | FIG. 7A |
| Cornering power (INDEX) | | 113 | 115 | 107 | 110 | 114 | 112 | 106 |
| RRC (INDEX) | | 94 | 94 | 93 | 94 | 93 | 94 | 89 |
| Noise performance (dB) | | +1.0 | +1.0 | +1.0 | +1.0 | +1.5 | +1.5 | +2.0 |

All of the Example Tires 1 to 11 exhibited improved cornering power along with better rolling resistance performance and noise performance.

REFERENCE SIGNS LIST 1, 51 Circumferential groove
3 Inclined belt
3a, 3b, 33a, 33b, 63a, 63b Inclined belt layer
4 Circumferential belt
4a, 4b, 34a, 34b, 64a Circumferential belt layer
5, 55 Land portion
6, 56 Tread
12 Carcass
C Central region
CL Tire equator
R Land portion continuous in tire circumferential direction
TE Ground contact edge of tread

The invention claimed is:

1. A pneumatic tire comprising:
a carcass toroidally extending between a pair of bead portions;
an inclined belt formed by two inclined belt layers including cords that extend at an inclination angle of equal to or greater than 35° and equal to or smaller than 90° relative to a tire circumferential direction and a circumferential belt formed by one or more circumferential belt layers including cords that extend at an inclination angle of 5° or less relative to the tire circumferential direction, the inclined belt and the circumferential belt being provided at an outer side of a crown portion of the carcass in a tire radial direction; and
a tread disposed at an outer side of the circumferential belt in the tire radial direction;
wherein the circumferential belt has a higher tire circumferential direction rigidity per unit width in a central region including a tire equator than in other regions;
in a region of a surface of the tread including at least the tire equator, the tread includes a land portion continuous in the tire circumferential direction;
when an internal pressure of the pneumatic tire is set to 250 kPa or higher, a sectional width SW and an outer diameter OD of the pneumatic tire satisfy either one of the following relational expressions:
SW/OD≤0.26 and SW<165 mm, or
OD≥2.135×SW+282.3 mm and SW≥165 mm; and
a width of the central region in a tire width direction, centered on a tire equator, is between 0.2 and 0.6 times a width of the circumferential belt in the tire width direction.

2. The pneumatic tire of claim 1, wherein a width, in the tire width direction, of the land portion continuous in the tire circumferential direction is equal to or greater than 20 mm and equal to or smaller than 40 mm.

3. The pneumatic tire of claim 1, wherein the number of the circumferential belt layers in the tire radial direction is greater in the central region than in the other regions.

4. The pneumatic tire of claim 1, wherein the tread comprises a plurality of circumferential grooves extending along the tire circumferential direction, and edges of the central region in the tire width direction are positioned within an opening width of the circumferential grooves.

5. The pneumatic tire of claim 1, comprising two of the circumferential belt layers in the central region and one of the circumferential belt layers in the other regions.

6. The pneumatic tire of claim 1,
wherein the inclination angle of the cords in the inclined belt layers relative to the tire circumferential direction is equal or greater than 55° and equal or smaller than 85°.

7. The pneumatic tire of claim 1,
wherein the inclined belt is consisted of a first inclined belt layer and a second inclined belt layer;
wherein the first inclined belt layer includes first inclined cords that inclined in one direction relative to the tire circumferential direction; and
wherein the second inclined belt layer includes second inclined cords that inclined in opposite direction relative to the tire circumferential direction.

8. The pneumatic tire of claim 1,
wherein the inclined belt is consisted of a first inclined belt layer and a second inclined belt layer;
wherein the first inclined belt layer includes first inclined cords that inclined in one direction relative to the tire circumferential direction; and
wherein the second inclined belt layer includes second inclined cords that inclined in opposite direction relative to the tire circumferential direction; and
wherein the inclination angle of the first inclined cords and the second inclined cords is equal or greater than 55° and equal or smaller than 85°.

9. The pneumatic tire of claim 1,
wherein the inclined belt is consisted of a wide inclined belt layer and a narrow inclined belt layer;
wherein the wide inclined belt layer includes first inclined cords that inclined in one direction relative to the tire circumferential direction;
wherein the narrow inclined belt layer includes second inclined cords that inclined in opposite direction relative to the tire circumferential direction; and
wherein the width of the circumferential belt is greater than the width of the narrow inclined belt layer and smaller than the width of the wide inclined belt layer.

10. The pneumatic tire of claim 1,
wherein the inclined belt is consisted of a wide inclined belt layer and a narrow inclined belt layer;
wherein the wide inclined belt layer includes first inclined cords that inclined in one direction relative to the tire circumferential direction;
wherein the narrow inclined belt layer includes second inclined cords that inclined in opposite direction relative to the tire circumferential direction;
wherein the width of the circumferential belt is greater than the width of the narrow inclined belt layer and smaller than the width of the wide inclined belt layer; and
wherein the narrow inclined belt layer is provided radially outside of the wide inclined belt layer and the circumferential belt is provided radially outside of the narrow inclined belt layer, such that a widthwise end of the circumferential belt contacts with the wide inclined belt layer.

11. The pneumatic tire of claim 1, further comprising a pair of circumferential grooves disposed on either side of the tire equator, wherein the land portion continuous in the tire circumferential direction is defined by the pair of circumferential grooves.

12. The pneumatic tire of claim 11, wherein edges of the central region are positioned outside the circumferential grooves in the tire width direction.

13. The pneumatic tire of claim 11, wherein edges of the central region in the tire width direction are positioned within an opening width of the circumferential grooves.

14. The pneumatic tire of claim 1, further comprising a narrow circumferential belt layer disposed at the outer side of the inclined belt layers in the tire radial direction.

15. The pneumatic tire of claim 14, further comprising a wide circumferential belt layer disposed so as to cover the narrow circumferential belt layer.

* * * * *